United States Patent [19]
McSwiggin

[11] 3,780,850
[45] Dec. 25, 1973

[54] SLIDING PALLET ARTICLE SORTER
[75] Inventor: James L. McSwiggin, Cincinnati, Ohio
[73] Assignee: The Procter & Gamble Company, Cincinnati, Ohio
[22] Filed: Oct. 6, 1972
[21] Appl. No.: 295,638

[52] U.S. Cl. ............................ 198/31 AC, 209/74 R
[51] Int. Cl. ............................................. B65g 47/26
[58] Field of Search ................ 209/74 R, 82, 111.7, 209/121; 198/31 AB, 31 AC

[56] References Cited
UNITED STATES PATENTS
3,093,245  6/1963  Worcester .................. 198/31 AB X
3,129,803  4/1964  Giulie ........................... 198/31 AC Primary Examiner—Richard A. Schacher
Attorney—Richard C. Witte et al.

[57] ABSTRACT

A sorter for articles, typified by cases of product, of the type wherein the cases are delivered to a single infeed station and discharged at one of two or more stations is provided. A plurality of "pallets" traverse an endless loop and slide laterally along rod-like members. The lateral movement is controlled by a diverting means which is responsive to a control signal and contacts a first protrusion, typically a pin, on the pallets. Preferably, the diverting means is articulated to provide very high speed switching. After the initial diversion, a guide rail contacts a second protrusion on the pallet and leads the pallets axially along the rod-like members to the desired lateral location for discharge as the pallet progresses along the sorter.

1 Claim, 6 Drawing Figures

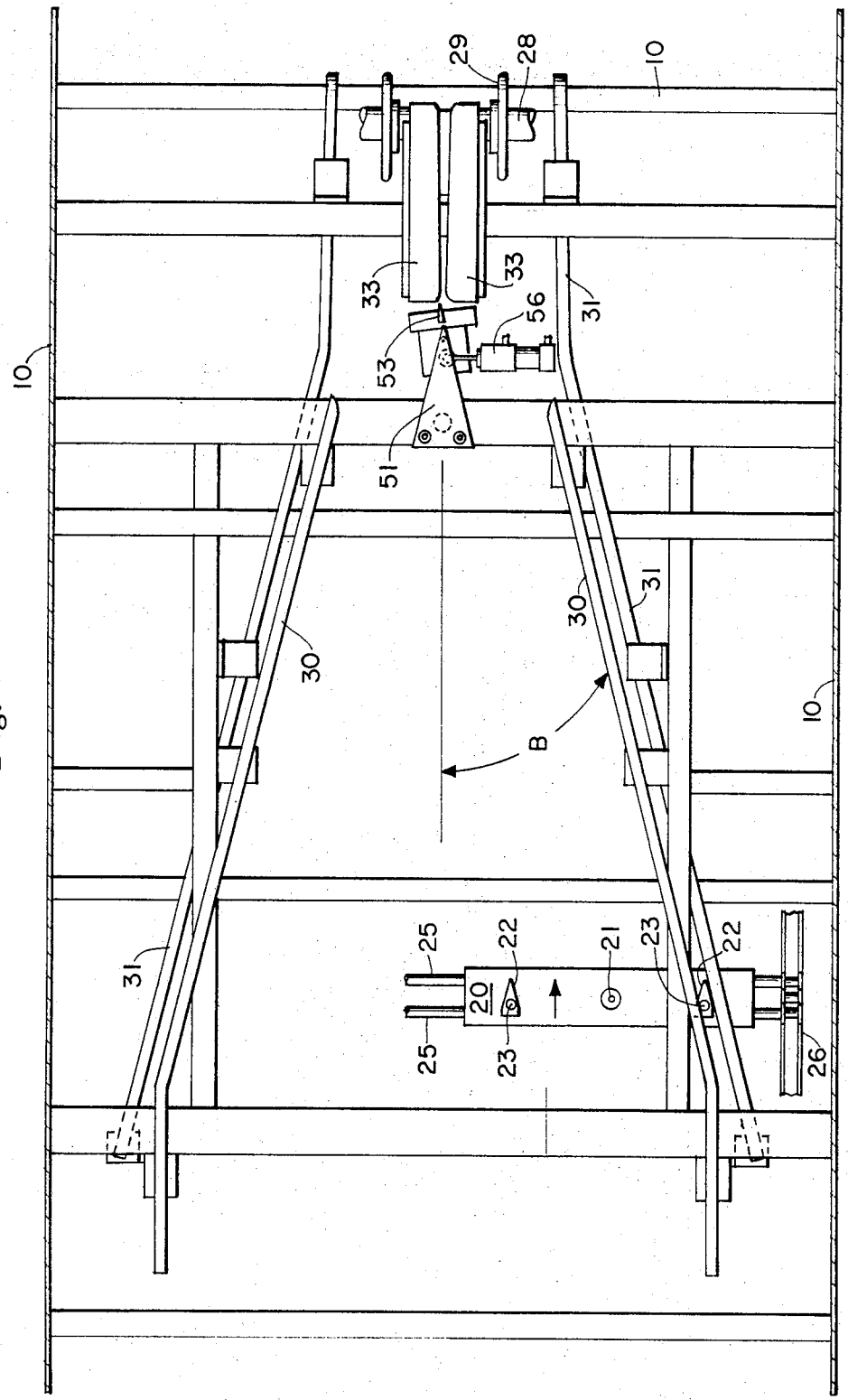

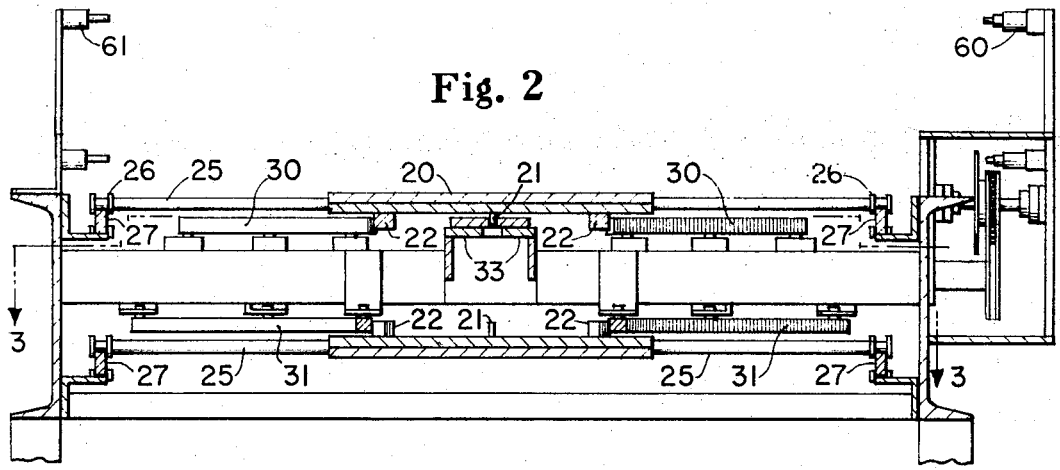
Fig. 2
Fig. 4
Fig. 6
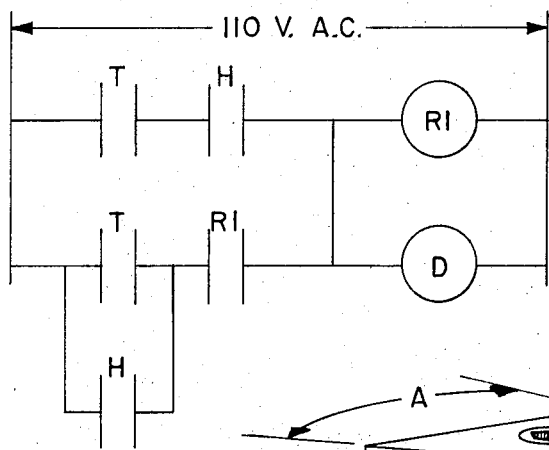
Fig. 5
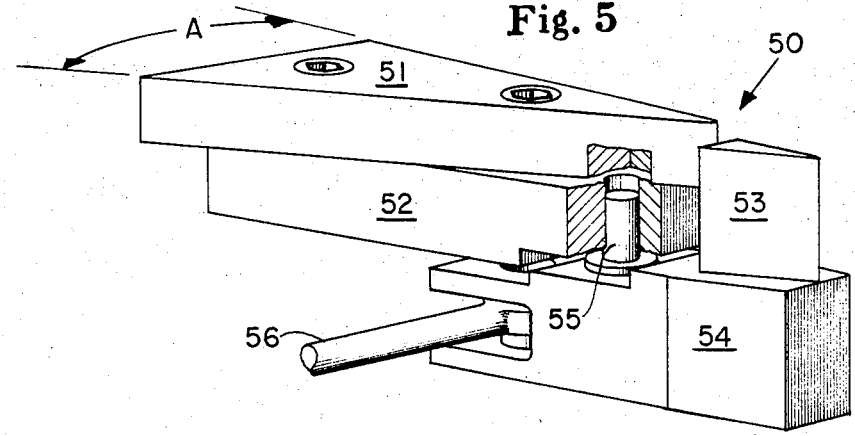

SLIDING PALLET ARTICLE SORTER

BACKGROUND OF THE INVENTION

This invention relates to sorters for articles such as cases of product and more particularly to such sorters wherein the cases are carried on pallets which are slidably mounted on rod-like members and conveyed thereby in an endless loop.

In the processing and warehousing of case goods, it is often desirable to convey two or more different types of cases on a single conveyor; for example, where the warehousing is remote from the packaging lines. It is then typically necessary to separate the commingled cases for subsequent handling.

A common means for effecting this sorting is a device commonly referred to as a sliding pallet sorter. In such a sorter, a plurality of "pallets" (article supporting members) are carried on tubes or rods about an endless loop and are laterally slidable thereon. At the infeed end of the sorter, the pallets are arranged in a single file at a predetermined location and cases are fed onto them. Although the pallets can be of any size, they are typically somewhat wider than the widest case which is to be handled and about 2 to 5 inches in the dimension along the machine (to provide flexibility in this direction and allow the use of comparatively small radius turns at either end of the machine). Thus, each case is typically supported on several pallets.

Any of the case identifying means known in the art can be used to provide a control signal to the sorter and initiate the desired diverting as will hereinafter be described. For example, when sorting cases of different dimensions, a photoelectric cell and light source can be mounted at an elevation just above the top of the shorter cases and below the top of the taller cases. Photoelectric character reading devices are also available to interpret coded data on cases.

In prior art sorters of this type, responsive to a control signal from any appropriate device, a diverter is actuated and placed in position to divert pallets and the cases thereon. The diverter engages a portrusion, typically a small hardened pin, extending from the pallet and directs the pallet as desired. The same pin then slides along a guide rail, as the pallet advances along the machine. As the pallet reaches the discharge of the machine it is, in this way, placed in line with one or two (or more if the sorter contains multiple diverters) preselected discharge stations.

Prior art devices of this type have served well in sorting operations operating at up to about 200 feet per minute. Operation above this speed has heretofore been difficult and generally impractical because of the difficulties in switching the diverter quickly and reliably and of the excessive wear of the hardened pin and/or the guide rails. The solutions to these two problems have heretofore been mutually exclusive. Making the diverting pin smaller to enable faster switching has increased pin wear and increased machine maintenance while providing large pins to reduce the wear on the pins and the parts which they contact requires operating the sorter slower to provide time to switch through the greater distances required with the larger pins.

Accordingly, it is an object of this invention to provide an improved pallet type sorter which can operate at higher speeds than are practical with prior art devices.

It is a further object of this invention to provide a diverting and guiding arrangement which provide reliable, high speed and low wear operation.

SUMMARY OF THE INVENTION

These and other objects are accomplished in a pallet type article sorter comprising two endless flexible driven carrier means with a plurality of parallel spaced rod-like members mounted therebetween. A plurality of pallets are mounted on the rod-like members and are axially slidable thereon. Each pallet has at least two protrusions on it. A movable diverter is provided to selectively contact a first of the protrusions and displace the pallets, as desired, in at least one direction. A guide means then contacts a second of said protrusions and, as the pallet advances along the machine, further displaces the pallet in the direction of initial displacement.

BRIEF DESCRIPTION OF THE DRAWINGS

Although the specification concludes with claims particularly pointing out and distinctly claiming the subject matter regarded as forming the present invention, it is believed that the invention will be better understood by reference to the following description taken in connection with the accompanying drawings in which:

FIG. 2 is a vertical cross-sectional view of the apparatus of FIG. 1, taken along line 2—2;

FIG. 3 is a horizontal cross-sectional view of the apparatus of FIG. 1, taken along line 3—3 in FIG. 2;

FIG. 4 is a detailed, fragmented, perspective view of the timing mechanism preferably used with the present invention;

FIG. 5 is a detailed, fragmented, perspective view of a preferred embodiment of the diverting mechanism of the present invention; and FIG. 6 is a schematic diagram of part of a typical control circuit for use with the present invention.

DESCRIPTION OF THE PREFERRED EMBODIMENTS

Figure 1:
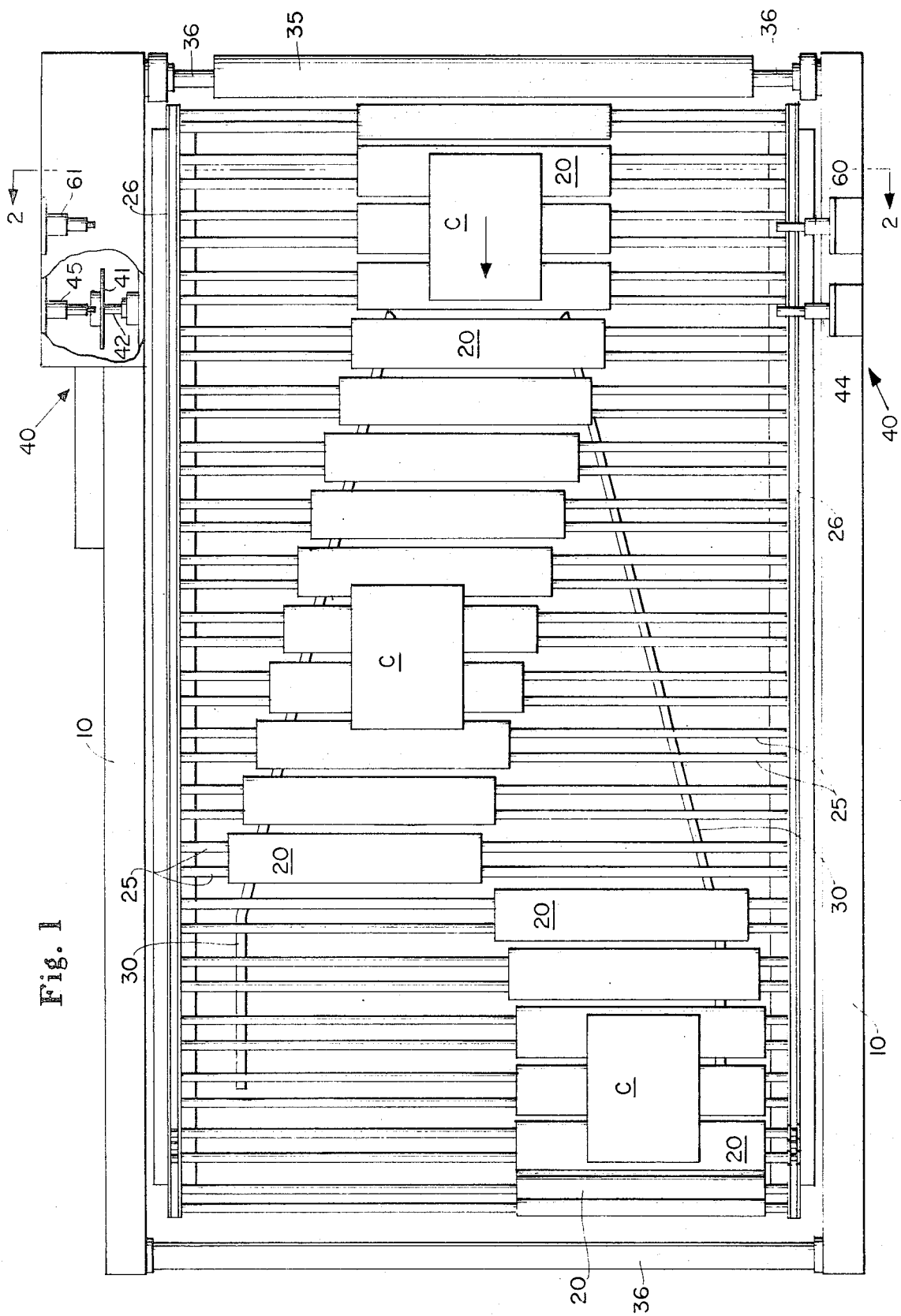
FIG. 1 is a plan view of a preferred embodiment of the present invention.

Turning now to the drawings, FIG. 1 is a plan view of the preferred embodiment of the present invention. A frame 10 and various support members connected thereto serve as a base for the machine and are conventional, not warranting further discussion herein. A plurality of pallets 20, which are shown in more detail in FIGS. 2 and 3, are slidably mounted on rod-like members, tubes 25. Preferably, each pallet 20 is connected to two of the tubes 25, resulting in a stable support without any loss of flexibility. Each of the tubes 25 is affixed at each end to one of the chains 26 which serve as an endless flexible carrier means for the tubes 25 and the pallets 20. A conventional drive means, typically including a motor, shafts and sprockets, not shown, drives the chains 26.

Cases of product C or other articles to be sorted are fed in spaced relationship in the direction of the arrows from an infeed conveyor, for example a belt conveyor, which forms no part of the present invention and is not shown. Preferably, a roll 35 mounted on shaft 36 is provided and is driven in synchronization with and by the same drive means as the chain 26, providing a transition between the infeed conveyor and the pallets 20. A discharge roll 36 similarly provides a smooth transition to a discharge conveyor, not shown.

A timing system designated generally by the numeral 40 is provided and is shown in more detail in FIG. 4. The purpose of the system 40 is to control the exact timing of actuation of the movable diverting means, diverter 50, which is shown in FIGS. 3 and 5, thereby avoiding jamming of the machine as will hereinafter be more fully described.

After the diverter 50 provides an initial displacement of a pallet 20, by contact with a first protrusion thereon, pin 21, the guide rails 30, which are shown more clearly in FIG. 3, contact a second protrusion, guide 22, and assume control of the pallet, moving it transversely of the machine along the tubes 25. As can be seen from FIG. 1, the result of the aforementioned actions is to divide the cases or other articles to be sorted into two groups which discharge at two separate points. If further separation is desired, additional diverging can be done either integral to the same machine or with additional machines in tandem.

In lieu of diverting either way from center as shown, the infeed point can be at one side of the machine if desired and, in this case, the diverter would only be used when a pallet 20 was to be diverted to the other side of the machine. The system shown is preferred, however, as the lateral distance which a pallet 20 must travel is minimized, thereby minimizing the angle of travel (for a given length of machine). As the angle of travel decreases, the friction and wear on the parts causing the travel also decrease.

Referring now to FIGS. 2 and 3, the preferred pallet 20 consists of two identical extrusions or machined pieces of high molecular weight polyethylene which mate around the tubes 25. A three eights inch diameter flame hardened diverting pin 21 is provided on the bottom of the pallet 20 (as the pallet 20 is on the top of the sorter). Two guides 22 (when the diverting is done in two directions as preferred) are attached to the bottom of the pallet 20 with bolts 23 which can also serve to clamp the two parts of the pallet 20 about the tubes 25. The guides 22 are also preferably made of high molecular weight polyethylene and are designed to provide a larger flat surface of contact with the guide rails 30 and the return guide rails 31 thereby minimizing the point loading and wear on these parts. The guide rails 30 and 31 can be, for instance, 1 inch cold rolled steel bar stock.

Referring now to FIGS. 3 and 5, the diverter designated generally by the numeral 50 provides a means for selectively sliding the pallets in at least one direction from their initial position and consists of a triangularly shaped fixed "delta" 51 mounted on a base 52 and a triangularly shaped "movable delta" 53 affixed to a pivot plate 54. The pivot plate 54 is attached to the base 52 by a pin 55. A diverting actuator such as the air cylinder 56 (with its associated controls, not shown) is pivotally connected by its rod to the pivot plate 54.

Preferably, the distance between the pin 55 and the point of connection of the air cylinder 56 is less than the distance between the pin 55 and the forward edge of the movable delta 53. This preferred arrangement provides a mechanical speed/distance advantage permitting the forward edge of the movable delta 53 to travel faster than the stroking speed of the air cylinder 56. The utility of such a speed advantage when operating the sorter at high speeds is apparent; at conveying speeds of 300 feet per minute with pallets 20 on 4 inch centers the pins 21 pass every 0.0667 seconds and only about half of that time is available for movement of the movable delta 53 (the remainder of the time being required for sensing and the initiation of the switching). During the available time the leading edge of the movable delta 53 must move about 7/16 inches, or at an average velocity about 13 inches per second. Typical air cylinder operating rates are barely compatible with this speed requirement when operated at very short stroke, thus, the speed amplification advantage is highly desirable if not mandatory.

FIG. 4 shows in detail the timing system 40 which is preferably used with the present invention. A timing disk 41 is mounted on shaft 42 and is provided with one or more apertures 43. A light source 44 and photoelectric cell 45 are mounted so as to sense the passage of an aperture therebetween. The disk 41 is driven at the same time as the chains 26 are driven, preferably by the same drive means, and with a speed and timing such that one of the apertures 43 is aligned with the photoelectric cell 45 just as each pin 21 passes the movable delta 53.

The timing operation of the diverting mechanism 50 can best be understood with reference to the circuit diagram of FIG. 6. Although controls in addition to those herein described will generally be used, any such additional controls can be provided by one skilled in the art in view of the following discussion of the operation of the principal typical controls.

As mentioned previously, a common way of sorting cases is by height although code readers and other means can also be used. When sorting by height, a "high" photoelectric cell 60 and its associated light source 61 are typically used and will be mounted above the conveyor at an elevation such that a tall box will "break" the light beam and cause the relay contacts designated H in FIG. 6 to switch while a short box will not. The timing photoelectric cell 45 also functions to detect cases, whether "high" or "low" as they pass thereby, causing its relay contacts designated T in FIG. 6 to switch (close). The "high" photoelectric cell 60 and light source 61 are mounted slightly upstream (in the direction of movement of the cases C) from the timing and case detecting photocell 45, thus providing a short time for switching before switching is inhibited by the presence of a case at the timing and case detecting photocell 45. (As mentioned previously, the cases are fed in spaced relationship.)

In FIG. 6, the control circuit is shown as it would be at the beginning of operation of the apparatus; i.e., with no case affecting the photocells. It is assumed that the tall cases are to be diverted in the direction requiring energization of the diverter solenoid D and that short cases require deenergization thereof. The switch T associated with the timing photocell is shown as it is when the disk 41 is blocking the lignt 44; i.e., when it is not desired to switch the diverter 50 by energizing the diverter solenoid D.

As a short case passes the photocells, the timing and case detecting photocell 45 remains deenergized and the associated relay contact T remain as shown in FIG. 6. The "high" relay contact H from the high photocell 60 is unaffected and remains open; consequently, the diverter solenoid D is not energized. As a tall case passes the photocells, the high relay contact H is closed and, when the timing and case detecting relay contact T is closed by the action of photocell 45, the diverter solenoid D is actuated. In addition, the relay R1 is thereby energized and provides a "hold-in" circuit to keep the diverter energized until the "high" case has passed the diverter. Once energized, the diverter is de-energized only upon the simultaneous occurrence of three events: the absence of a "high" case affecting the "high" photoelectric cell 60; the absence of any case affecting the timing and case detecting photocell 45; and, the proper positioning of the pallet 20 to be diverted (as directed by the timing and case detecting photocell 45). The net effect of the controls described is to switch the diverter 50 at the optimum time (i.e., immediately as one pin has passed and with the maximum time for switching before the next pin arrives) and to maintain the diverter in the desired position until the case being switched has completely passed the diverter 50.

The remainder of the case sorter can best be described by tracing the path of a pallet 20 and describing the elements with which it interacts. The movable delta 53, as mentioned, provides the initial diversion of the pallets 20 by contacting the pins 21 thereon. Because of its abrupt contact with the pins 21 and the resulting shock loading, the movable delta 53 is preferably made of flame hardened steel as is the fixed delta 51 which provides a continuation of the diverting action after the pin 21 passes the movable delta 53. The fixed delta 51 will preferably have an included angle A of 28° between its vertical pin contacting faces, providing a satisfactory amount of travel without creating excessive wear. The pin contacting faces of the movable delta 53 are designed to be aligned with the pin contacting faces of the fixed delta 51 as shown more clearly in FIG. 3 which illustrates the movable delta 53 shifted so as to contact the pins 21 with its left face end divert the pallets 20 to the left (as viewed looking from the sorter infeed to the discharge).

After the pallets 20 have been initially diverted they continue along the case sorter and the guides 22 come in contact with the guide rails 30. The pallets 20 are thus further slid along the tubes 25 as they proceed toward the discharge of the sorter. The angle B between the guide rails 30 and the longitudinal axis of the sorter must be small enough to minimize wear while being large enough to move the pallets to the desired lateral position for discharge within a reasonable distance. 14° is generally satisfactory at speeds of 300 FPM or lower. The faces of the guides 22 which contact the guide rails 30 are designed with the same angle to provide a large flat region of contact therebetween, minimizing wear. With the provision of guides 22 and guide rails 30 the major source of wear on pin 21 in prior art sorters of this type is eliminated, thereby allowing the use of comparatively small pins 21 which results in faster switching (the diverter travels through a shorter distance) and consequently allows faster sorter operation.

With continuing reference to FIG. 3, the portion of the guide rail 30 adjacent the discharge end of the sorter is parallel to the longitudinal axis thereof. As the pallets 20 pass the end of the guide rail 30 they reach the discharge points and the cases carried thereon are removed. The pallets 20, carried by the tubes 25 and chains 26, continue around the discharge end of the sorter. The return guide rails 31 then contact the guides 22 which recenter and return the pallets 20 to the movable diverter means at the infeed end of the sorter. The return guide rails 31 extend so as to maintain control of the pallets 20 as they come up to the infeed location at which point the pins 21 are precisely centered by the centering rails 33, which can be made of high molecular weight polyethylene or hardened steel, prior to reaching the diverter. Preferably at the infeed and optionally at the discharge ends of the sorter, disks 29 mounted on shafts 28 are provided to aid in supporting the pallets 20 and rods 25. The cases C are relatively far from the support of the machine frame at the infeed thus making the provision of additional support at the infeed particularly desirable.

The present invention, by providing separate means for initial diversion through a short distance and separate guides and rails to provide the remaining diversion has largely overcome the wear problems associated with high speed pallet type case sorters in the prior art. In addition, the use of an articulated means to provide initial diversion has allowed still higher operating speeds. Many modifications can be made to the present invention without departing from the spirit and scope thereof. The foregoing is intended as descriptive and not limiting; the scope of the invention being as set forth in the appended claims.

What is claimed is:
1. A sorting apparatus comprising:
A. two endless flexible carrier means disposed one in each of two parallel paths;
B. a means for driving said endless flexible carrier means;
C. a plurality of parallel, spaced rod-like members, said members being affixed at each end to one of said flexible carrier means;
D. a plurality of pallets, each of said pallets being mounted on at least one of said rod-like members and adapted to slide axially thereon; each of said pallets having at least two protrusions thereon;
E. a movable diverting means for selectively sliding said pallets in two directions along said rod-like members by contacting a first of said protrusions, said movable diverting means consists of a triangularly shaped member, said member being pivotally mounted to a fixed triangularly shaped member, one face of said fixed and said movable members being aligned upon diversion of said movable member in a first direction and a second face of said members being aligned upon diversion thereof in a second direction;
F. a guide means for further sliding said pallets along said rod-like members by contacting a second of said protrusions; and
G. a means for returning said pallets to said movable diverting means.

* * * * *